United States Patent [19]

Berg

[11] 4,185,697
[45] Jan. 29, 1980

[54] TORSION BAR DRAFT LOAD LIMIT AND PRELOAD ADJUSTER

[75] Inventor: David A. Berg, Milwaukee, Wis.

[73] Assignee: Allis-Chalmers Corporation, Milwaukee, Wis.

[21] Appl. No.: 840,292

[22] Filed: Oct. 7, 1977

[51] Int. Cl.² .......................................... A01B 63/112
[52] U.S. Cl. .................................................... 172/10
[58] Field of Search ...................... 172/2, 3, 7, 9, 10, 172/11, 12; 73/89, 99, 141 A; 37/DIG. 1; 214/762, 763; 280/405 B

[56] References Cited

U.S. PATENT DOCUMENTS

| 3,246,702 | 4/1966 | Carlin | 172/10 |
| 3,700,043 | 10/1972 | Sullivan | 172/411 X |
| 3,722,598 | 3/1973 | Peterson | 172/10 |

Primary Examiner—Richard T. Stouffer
Attorney, Agent, or Firm—Arthur L. Nelson

[57] ABSTRACT

A draft load sensing mechanism for a vehicle having a torsion bar carrying the draft load from the lower draft arms which produce a torsion load on the bar. A preload adjusting screw applies a preload torque to the torsion bar and a load limit adjusting screw limits the maximum torque load that can be applied to the torsion bar responsive to the draft load on the vehicle.

10 Claims, 3 Drawing Figures

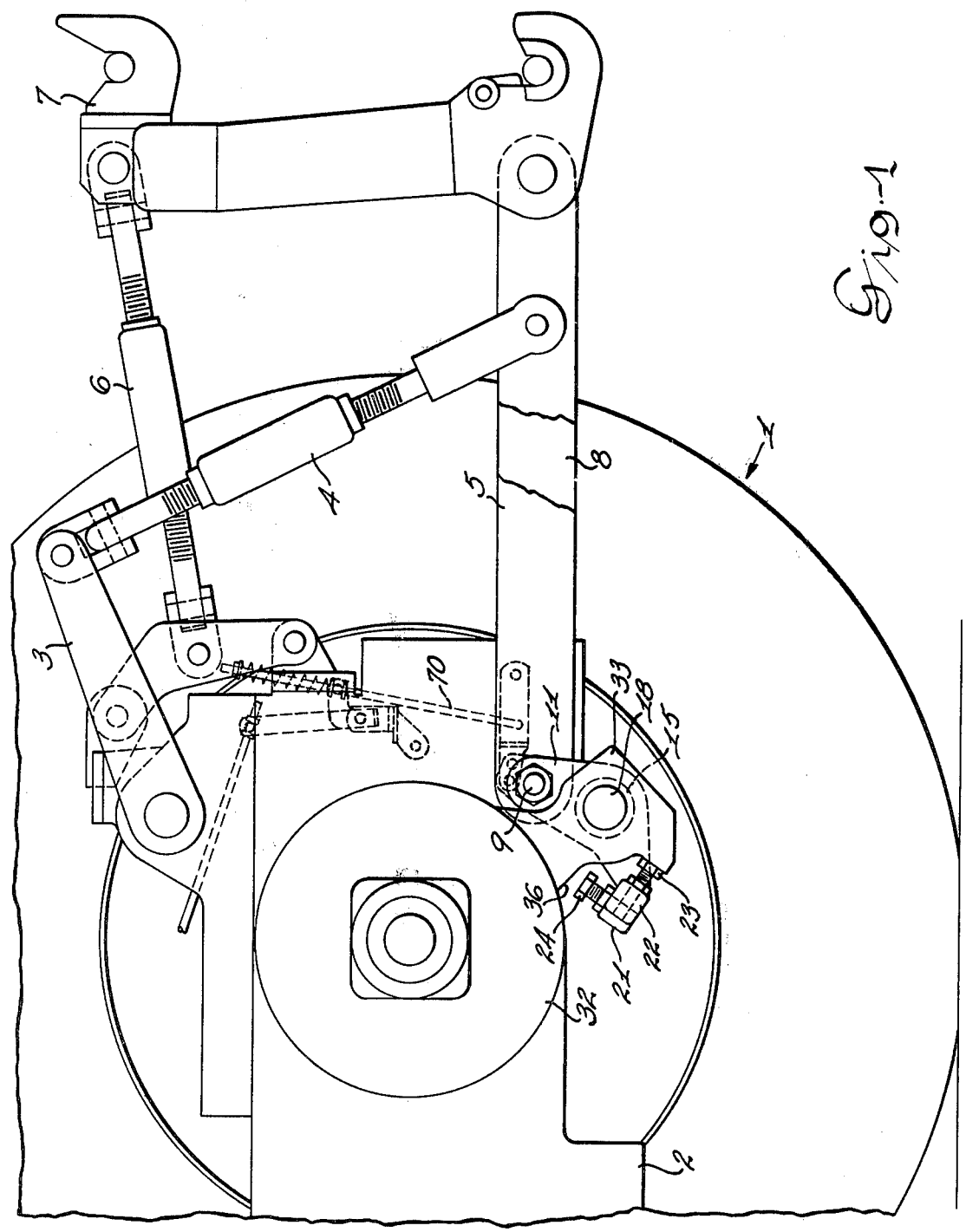

TORSION BAR DRAFT LOAD LIMIT AND PRELOAD ADJUSTER

This invention relates to a draft load sensing system for a tractor and more particularly to a torsion bar having a preload adjusting screw to preload the torsion on the bar and a load limit adjusting screw to limit the maximum torsion load that can be applied to increase the strain proportionally to the draft load on the torsion bar.

The modern tractor having a hydraulic weight distribution system is provided with the draft load sensing mechanism to a initiate a signal in response to the draft load. The conventional sensing mechanism is mechanical and the initial signal is generated by a deflection in the bar such as a torsion bar which is multiplied through a linkage to operate a hydraulic valve in a hydraulic system to redistribute the weight of the tractor in response to the draft load. Simultaneously with the redistribution of the weight on the front and rear wheels of the tractor the implement is raised or lowered to the proper traction required for the particular load applied to the draft mechanism on the tractor. The torsion bar is mounted on the rear-end housing of the tractor and the draft arms connected in such a manner to apply a torsion load on the bar in proportion to the draft load applied to the lower draft arms. Since it is not practical to transmit a signal for low loads on the torsion bar, the torsion bar usually is preloaded by placing a torque on the bar and thereby preventing operation of the mechanism under light draft loads. Also provided is a stop to prevent overstressing of the torsion bar when it is subjected to excessive draft loads.

Reference may be had to the U.S. Pat. No. 3,246,702 Carlin, Draft Sensing Device for Tractor Hydraulic System and U.S. Pat. No. 3,722,598, Donald A. Peterson, Torsion Bar Draft Load Adjuster. These patents disclose a torsion bar sensing mechanism in which an adjustment is provided for a preload torque on the bar to avoid oversensitivity for light loads applied to the tractor. The Carlin patent shows the adjusting screw providing a preload, torque on the torsion bar, however, with an increase in the preload, the load range on the torsion bar is correspondingly decreased. The adjusting screw is such that a high preload torque on the torsion bar would cause the torsion bar to bottom out on the abutment provided for maximum loading on the torsion bar after limited movement. The Peterson patent likewise provides a preload adjusting screw for producing a torque in the torsion bar and requiring a minimum load before a signal is generated in the sensing mechanism. Although the Peterson patent does not decrease the load range between initial operation of the torsion bar sensing mechanism and maximum load, there is no adjustment to vary the load range unless a different screw than the one shown is used to increase or decrease the load range. Accordingly, this invention provides for a preload torque adjusting screw to vary the initial loading of the torsion bar to initially generate the load sensing signal. Likewise a second adjusting screw is provided for the maximum load limit of the torsion bar which would generate a draft load signal. In this manner a further refinement of the invention is provided in which the preload torque is adjustable and the maximum torque which may be applied to the lower draft arms and generate a proportionate increasing signal through movement of the torsion bar mechanism.

Accordingly, this invention provides for the improvement of a preload torque adjusting screw and a maximum torque load adjusting screw for the torsion bar of a draft load sensing system.

It is an object of this invention to provide a draft load sensing mechanism having means for adjustably setting the preload torque on the torsion bar and adjustably setting the maximum load torque and load range of the torsion bar.

It is another object of this invention to provide a draft load sensing mechanism including a torsion bar with means for adjustably setting the preload torque on the torsion bar and means for adjustably setting the load limit and the load range for the draft loading sensing device.

It is a further object of this invention to provide a load sensitive mechanism including a torsion bar having a draft load eccentrically applied to the torsion bar with an adjustable preload torque screw adjustably preloading the minimum draft load for initiating a draft signal and providing an adjustable limit stop which determines the maximum draft load providing a draft signal from the draft load sensing mechanism and varying the load range for the sensing mechanism.

The objects of this invention are accomplished by mounting a torsion bar which is fixed to the vehicle chassis and received within a torsion tube and fastened on the opposite end of the torsion bar. A pair of arms are fixed at each end of the torsion tube which in turn pivotally connect two lower-draft arms which carry the draft load of the vehicle when the draft load is applied. Accordingly, the draft load is transmitted through the torsion bar by creating a torque in the bar to stress the torsion bar in response to the draft load. The strain in the torsion bar caused by the draft load initiates a signal transmitted through a linkage from the draft sensing mechanism to control a valve in the hydraulic weight distribution system. The torsion tube also carries a flange having a threaded opening to receive the preload adjusting bolt to provide adjustment. The chassis defines a preload abutment for engaging the preload adjusting screw. A limit stop is also formed by the vehicle chassis angularly spaced from the flange carrying adjusting screw. On the opposite side of the flange a threaded opening is provided to receive an adjustable load limit screw. The adjustment of the load limit screw provides adjustment for the maximum load limit with a maximum load signal transmitted from the torsion bar and also the load range through which the draft load can operate. Accordingly, the preload adjustment screw presets an initial torque in the torsion bar as it engages an abutment on the vehicle chassis and the load limit adjusting screw limits the maximum torsional stress which can be applied to the torsion bar by draft loading. The load range is varied by the preload adjusting screw and load limit adjusting screw.

The preferred embodiment of this invention is illustrated in the attached drawings.

FIG. 1 is a side-elevation view of a three-point hitch mounted on the tractor connected to the torsion bar a draft load sensing mechanism;

Figure 3:
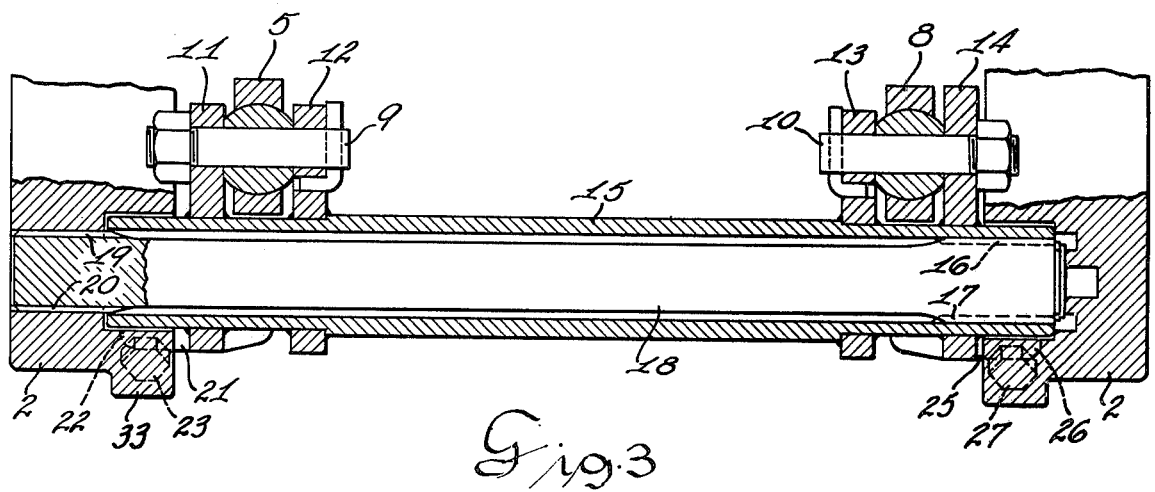
FIG. 3 is a cross section view taken on line III—III of FIG. 2.
Figure 2:
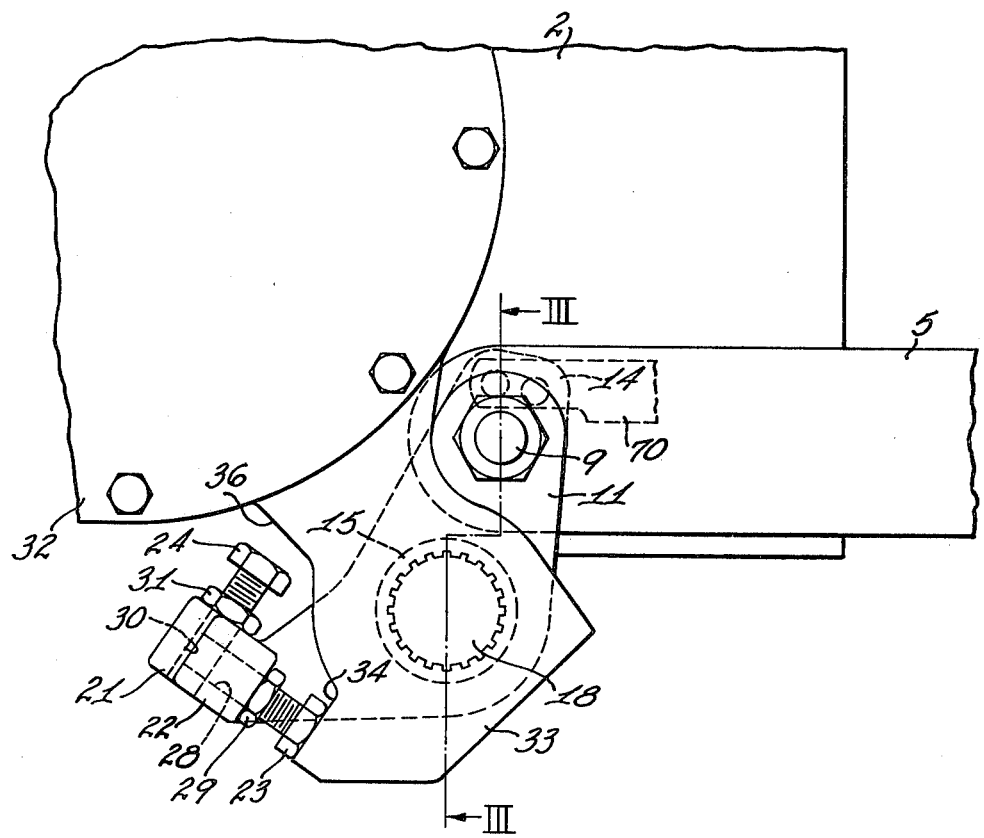
FIG. 2 is an enlarged view of the adjustable preload adjusting screw and the adjustable load limit screw.

Referring to FIG. 1 the tractor 1 includes a chassis 2 for supporting the rock arms 3 of which one is shown connected to a lift link 4 pivotally connected to one of the lower draft arms 5. The upper link 6 is connected between the tractor and a hitch adaptor 7. The lower draft arms 5 are connected to the hitch adaptor 7 on their rear ends.

The lower draft arms 5 and 8 are pivotally through the pins 9 and 10 to the arms 11, 12, 13 and 14 respectively. The arms 11, 12, 13 and 14 are fixed to the torsion tube 15. The torsion tube 15 forms a spline 16 which mates the spline 17 on the end of the torsion bar 18. The torsion bar 18 similarly forms a spline 19 which mates the spline 20 on the vehicle chassis and fixes the left-hand end of the torsion bar in the chassis 2. The arm 11 is integral with the flange 21 which extends radially from the torsion tube 15 and axially to form the support 22 for the preload adjustment screw 23 and the adjustable load limit screw 24. Similarly the arm 14 forms the flange 25 and a support 26 for the adjustment screws on which screw 27 is shown.

Arms 11 and 14 are symmetrical and arm 11 mounts on the left-hand side of the torsion tube 15 while the arm 14 mounts on the right-hand side of the torsion tube.

The support 22 supports the preload adjusting screw 23 which threadedly engages an opening 28 in the support 22 the lock nut 29 locks the preload adjusting screw 23 in a fixed position once the adjustment is made.

The load limit adjusting screw 24 threadedly engages a threaded opening 30 in the support 22 and the lock nut 31 locks the load limit adjusting screw 24 in its adjusted position. The rear drive assembly housing 32 includes the flange 33 which defines the abutment 34 which engages the head of the preload adjusting screw 23 a preload torque is applied through the torque tube 15 to the torsion bar 18.

Similarly the flange 33 forms the abutment 36 for engaging the head of the adjustable load limit screw 24 when a maximum load is applied to the lower draft arms 5 and 8.

The operation of the device will be described in the following paragraphs.

The load of the implement is applied to the hitch adapter 7 which is pivotally connected to the upper link 6 and the lower draft arms 5 and 8. The forward ends of the lower draft arms 5 are pivotally connected through the arms 11, 12, 13 and 14. The arms 11 and 14 also are integral with the flanges 21 and 25 respectively. The flanges 21 and 25 each carry a support 22 and 26 respectively. These supports are symmetrical with each other and control the preload adjustment on the right and left-hand end of the torsion tube 15. The left-hand adjustment mechanism will be described and it is understood that the mechanism on the right-hand end operates in the same manner.

In order to provide a preload torque in the torsion bar 18 the preload adjusting screw 23 is screwed outwardly from the support 22 to torque the torsion bar 18. When the desired preload torque is applied to the torsion bar 18 the lock nut 29 is locked firmly against the support 22 and the adjusting screw is locked in this position. The right-hand adjusting screw is similarly adjusted and tightened and this presets the preload torque so that the draft load sensing mechanism does not operate for light loads under the preload torque of the torsion bar. Any loads above the preload torque will then initiate a signal in the draft load sensing mechanism 70. The draft sensing mechanism 70 operates the hydraulic valve and the hyraulic weight distribution system to open and close the valve for redistribution of weight between the front and rear wheels of the tractor.

The support 22 also carries an adjustable load limit screw 24. The maximum load which will generate an increasing signal due to increase draft load is controlled through this adjustable screw 24. A similar adjustable load limit screw is provided on the right-hand side and the adjustment and operation of the right-hand adjustable load limit screw operates in the same manner as adjustable load limit screw 24.

The screw 24 is screwed outwardly to decrease the maximum load limit for generating a signal through the linkage 70. The screw is screwed into the support 22 to increase the maximum load signal to the load sensing mechanism 70. The lock nut 31 is firmly tightened against the support 22 when the adjustment is made on the adjustable load limit screw 24. The adjustment of the adjustable load limit screw 24 also varies the load range simultaneously with adjustment of the peak load for generating a load sensing signal of the load sensing mechanism 70. The greater the space between the head of the bolt 24 and the abutment 36 the greater the load range and similarly the greater the maximum load limit of the draft load sensing mechanism.

The embodiments of the invention in which an exclusive property or privilege is claimed are defined as follows:

1. A draft load sensing mechanism for a tractor comprising, a tractor chassis, a torsion bar having one end connected to said tractor chassis, a pair of draft arms, a draft load transmitting means including a torsion tube connected to the other end of said torsion bar and arms extending radially therefrom connected to said draft arms to apply torque to said torsion bar in response to the load on said draft arms, said chassis defining a fixed preload abutment and a fixed maximum load limit stop radially spaced from said torsion bar and angularly spaced a predetermined dimension from each other, a radial arm means connected to said torsion tube forming surfaces defining a lesser angular dimension than the abutment and stop for selectively engaging said abutment and said stop and defining a load range, said radial arm means including a preload adjusting member adjustably engaging said preload abutment for adjustably setting a preload torque on said torsion bar and the minimum signal generating draft load within the load range for said draft load sensing mechanism, said radial arm means including an element adjustably varying the angular dimension between said element and said maximum load limit stop independent of said preload torque adjusting member to infinitely vary the load range of the draft load sensing mechanism and the maximum signal generating draft load within the load range.

2. A draft load sensing mechanism for a tractor as set forth in claim 1 wherein said torsion tube receives said torsion bar.

3. A draft load sensing mechanism for a tractor as set forth in claim 1 wherein said torsion tube and said member of said preload adjusting means includes a screw for adjusting the preload torque, a lock nut for locking said screw in its adjusted position.

4. A draft load sensing mechanism for a tractor as set forth in claim 1 wherein said radial arm means on said torsion tube includes a screw support, said element of said adjustable load limit means includes a screw threadedly engaging said screw support, a lock nut on said adjustable load limit screw for adjustably locking said adjustable load limit screw in its adjustable position.

5. A draft load sensing mechanism for a tractor as set forth in claim 1 wherein said torsion tube defines an internal spline, said torsion bar defines a mating spline for reception of said spline of said tube, said torsion tube thereby applying torsional stress to said torsion bar in response to draft load.

6. A draft load sensing mechanism for a tractor as set forth in claim 1 wherein said torsion tube includes an arm integral with said torsion tube adapted for transmitting a signal to a hydraulic weight distribution system.

7. A draft load sensing mechanism for a tractor as set forth in claim 1 wherein said member and said element include a preload adjusting screw and an adjustable load limit screw on opposing sides of said radial arm means.

8. A draft load sensing mechanism for a tractor as set forth in claim 1 wherein said member and said element on said radial arm means define screws in a right angle position with heads for engaging said abutment and stop.

9. A draft load sensing mechanism for a tractor as set forth in claim 1 wherein radial arm means on said torsion tube defines a flange forming a screw support, said member of said preload torque adjusting means includes a screw mounted on said screw support, said element of said adjustable load limit means includes a screw mounted on said support to thereby adjustably apply a preload torque in said torsion bar and adjustably limit the load range and maximum load on said torsion bar.

10. draft load sensing mechanism on a tractor as set forth in claim 1 wherein said radial arm means includes a screw support mounted on said torque tube, said member includes a screw adjustably mounted in said screw support to adjustably set a preload torque in said torsion bar, said element includes a screw mounted in said screw support to adjustably compensate for the adjustable preload screw adjustment and vary the draft load range of said draft load sensing mechanism.

* * * * *